Oct. 29, 1957        R. B. WILLI        2,810,929
APPARATUS FOR COMPACTING AND EJECTING FLANGED ARTICLES
Filed May 6, 1953        2 Sheets-Sheet 2

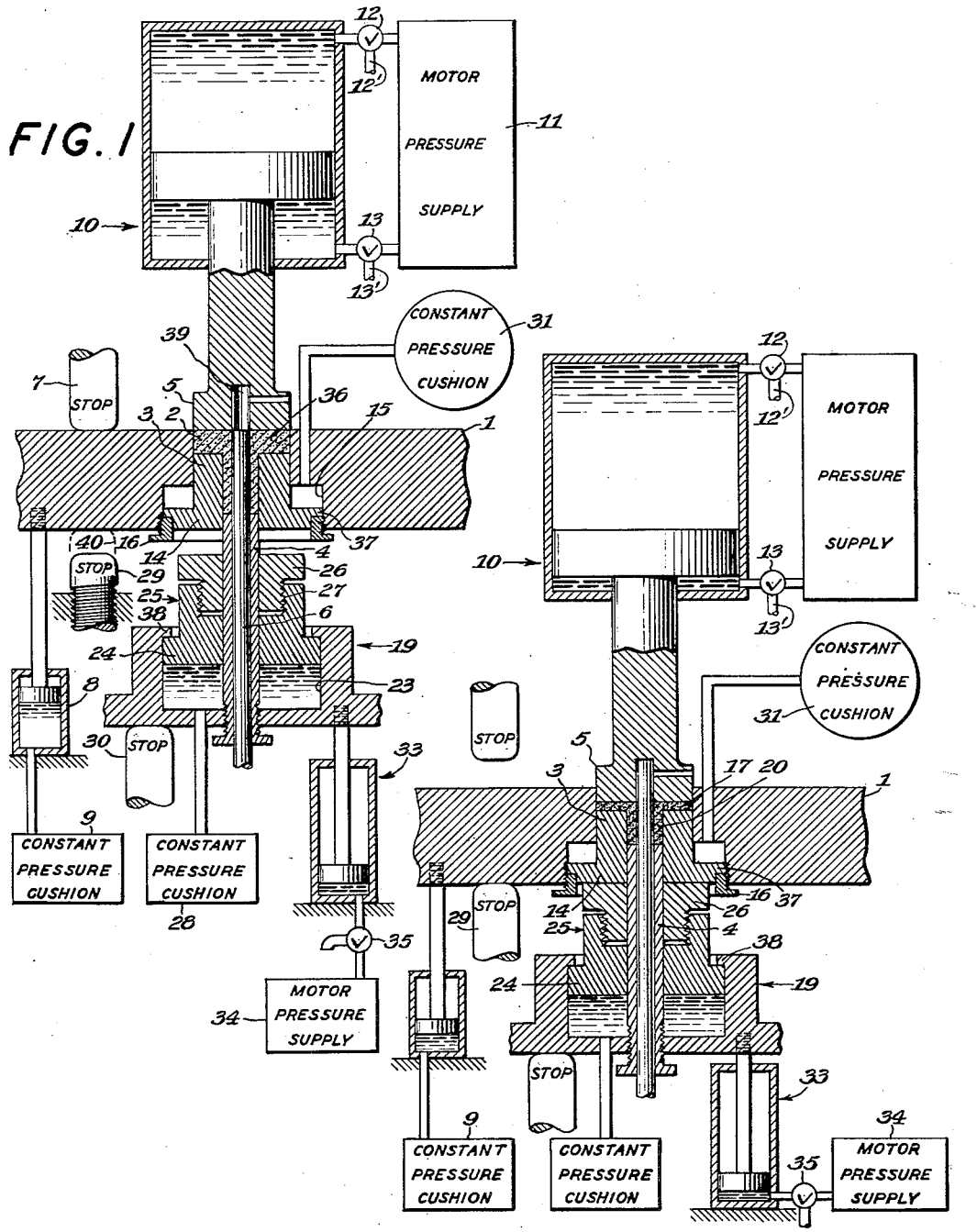

INVENTOR
RICHARD B. WILLI
BY
ATTORNEY 2,810,929
Patented Oct. 29, 1957

United States Patent Office

2,810,929
APPARATUS FOR COMPACTING AND EJECTING FLANGED ARTICLES

Richard B. Willi, Norristown, Pa., assignor to Baldwin-Lima-Hamilton Corporation, a corporation of Pennsylvania Application May 6, 1953, Serial No. 353,321

9 Claims. (Cl. 18—16.7)

This invention relates to pressing apparatus for forming flanged articles from loose material such as, for example, among others, as powdered metal.

Certain types of pressing apparatus heretofore used for forming flanged articles from powdered metal employ a usual die and a top punch in combination with independently movable lower concentric plungers. The mechanism necessary for producing the independent movements of these plungers as well as other movements during various portions of the operations is not as fully reliable or as completely effective in obtaining precision operation and control as is frequently necessary in forming a flanged article, especially an extremely thin flange. It will be understood that the problem of fracturing flanges during ejection is especially critical because of the green nature of the compacted powdered material before it is sintered.

In such prior presses the concentric bottom plungers are rendered independently movable by providing two individual actuating means, such as motors, whereby each plunger may, at least during certain portions of its operation, be moved independently of the other plunger. In my present invention I avoid the difficulties incident to having independently movable plungers and instead I have provided an improvement arrangement that utilizes only one motor in combination with means for obtaining a dependently movable relation of the lower concentric plungers. While prior devices for forming flanged articles have also employed dependently movable lower concentric plungers, yet such prior dependent arrangements have been deficient during the ejection operation.

It is an object of my invention to provide improved pressing apparatus employing dependently movable concentric lower plungers for forming and effectively ejecting powdered material flanged articles.

A still further object is to provide an improved ejection pressing apparatus for powdered material that is relatively simple and economical in construction, operation and maintenance and in which the forming and ejection elements may be readily accessible for repair or for the substitution of elements of different sizes.

Other objects and advantages will be more apparent to those skilled in the art from the following description of the accompanying drawings in which:

Fig. 1 is a mechanical diagram illustrating in vertical section the component parts of my improved pressing apparatus shown in position with the die cavity just filled and the pressing operation ready to commence;

Fig. 2 is a similar diagram but showing the material fully compacted into the ultimate shape of the article;

Figures 3, 4:
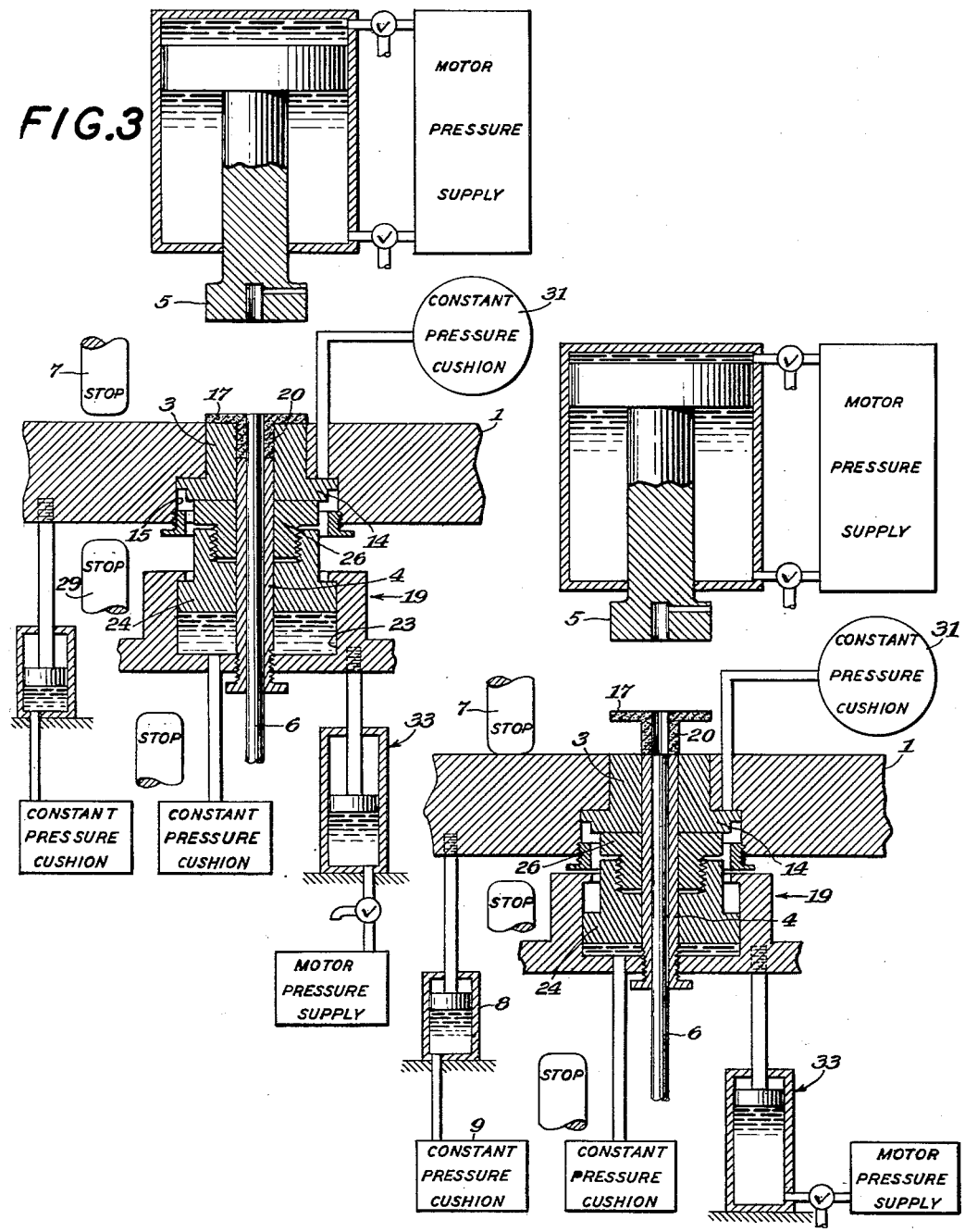
Fig. 3 is a further diagram showing the parts in their position when the flange is entirely ejected from the die cavity.
Fig. 4 is a further diagram showing the parts in their position for ejection of the entire article.

In the embodiment of the invention disclosed in Figs. 1 to 4, I employ a platen 1 having a die cavity 2 of suitable configuration, preferably cylindrical, whose lower end is closed by a pair of concentric elements 3 and 4, the element 3 being so constructed and operated that it actually constitutes only a fixed part of the die cavity during the compression operation but also constitutes a movable ejection plunger during the ejection operation whereas the element 4 constitutes a forming plunger in that it moves inwardly relative to the die cavity during the compression operation and also constitutes an ejection plunger. The upper end of the cavity receives a punch 5 while a core rod 6 extends through the lower concentric punches. These elements and the various means for operating, controlling and adjusting the same are only diagrammatically illustrated herein.

The platen 1 which preferably operates as a floating die, but which can also operate as a fixed die, is normally biased upwardly against a stop 7 by a suitable cushion piston and cylinder 8 supplied from any suitable source of constant fluid pressure 9. The top punch 5 may be operated either mechanically or hydraulically which, for diagrammatic purposes, is shown specifically as power means in the form of a piston and cylinder 10 actuated by operating fluid pressure from any suitable source 11 and controlled by three-way valves 12 and 13 having usual exhaust outlets 12′ and 13′. The bottom die cavity element 3 is of annular form and has a piston head 14 and a cylinder 15 formed within the die head. An axially adjustable stop 16 may be threaded in the lower end of cylinder 15 to provide means for variably positioning the fixed position of die element 3 within the cavity and accordingly determine the thickness of flange 17, Fig. 2, of the article to be formed. Disposed within a preferably cylindrical bore of the element 3 is the main bottom plunger 4 which is axially adjustably threaded in the bottom of a main ejector operating means 19 to determine the length of the body 20, Fig. 2, of the article. Extending through a cylindrical bore of bottom plunger 4 is the core rod 6 which may be axially stationary, or movable, as may be desired, but terminating at its upper or die end in any position desired depending upon the depth of the core hole within the article. In some instances the top of the core would be in the plane of the top surface of floating die 1 when the latter is in its upper position, Fig. 1. Contained within a cylinder 23 of the main ejector operating means is a piston 24 of an auxiliary ejector operating means 25 whose upper end 26 is axially adjustable as by threads 27. This adjustment, together with a vertically adjustable threaded stop 29 and a fixed stop 30 for main ejector 19 for limiting downward movement of the floating die and ejector mechanism 19, insures a proper initial engagement between certain elements whereby the ejection mechanism may then function to exert a uniform ejection pressure over the entire bottom surfaces of the formed article until its flange is free. The cylinder 15 for the ejector element 3 is provided with a constant downward biasing pressure from a cushion source 31. The auxiliary ejector 25 is biased upwardly relative to cylinder 23 by a constant hydraulic cushion pressure 28 which is great enough to support the weight of floating die 1 and to overcome not only the constant pressure in cylinder 15 but also whatever friction may be present between the compacted article and the walls of the die during ejection. The main ejector operating means 19 is moved upwardly by any suitable source of power diagrammatically shown as a piston and cylinder 33 actuated by hydraulic pressure from a supply 34 which may be controlled by a suitable three-way valve 35 having a usual exhaust outlet. It will be understood that the various control valves are merely diagrammatic illustrations of any suitable control devices.

*Operation.*—The elements will be initially in the position shown in Fig. 1 with the die cavity having been previously filled with powdered material 36 simply by raising the top plunger to admit material to the die cavity. Thereupon, as shown in Fig. 2, operating pressure will be supplied through valve 12 to the top of cylinder 10 and exhausted from its lower end through valve 13 and exhaust passage 13' thus causing top punch 5 to compact the powdered material to the shape 17, 20. During this compaction the frictional resistance between the compacted material and the walls of the die cavity will cause die 1, if operating as a floating die, to move downwardly against the cushion of constant pressure 9 which can be varied in accordance with the degree of compaction desired. The floating die continues its downward movement until engaging stop 29 at which time the piston 14 will simultaneously engage the top 26 of auxiliary ejector 25. In this downward position of the floating die the stop 29 and auxiliary ejector 25 should be adjusted so that each of them are engaged simultaneously as shown in Fig. 2. It will be noted that in this position the piston 14 has its shoulder 37 firmly seated on stop shoulder 16, and piston 24 of the main ejector operating means 19 is also firmly seated upwardly against a shoulder 38 of the ejector. The compacted article is now ejected by supplying operating fluid pressure from source 34 through valve 35 to cylinder 33, which is the single motor source or power actuating means, to move the main ejector 19 and auxiliary ejector 25 upwardly as a unit thereby simultaneously moving bottom plunger 4 and ejector element 3 upwardly without any relative movement occurring between these two punches, thereby to eject the article preferably until the flange 17 is entirely free of the die cavity. During this operation the element 3 moves against the cushion source 31 until movement of outer plunger 3 is interrupted by the piston 14 engaging the upper end of cylinder 15 as shown in Fig. 3. Also during this upward movement it is seen that the floating die 1 has been lifted from its stop 29, all of which is possible because the pressure of the fluid in the main ejector cylinder 23 is great enough to hold all of the component parts rigidly together in the positions shown in Fig. 3. This relation of parts will be maintained during further upward movement of the main ejector 19 which movement simply involves continued operation of the single motor 33 until the floating die 1 engages stop 7, as shown in Fig. 4, although this stop could be engaged anytime during the initial ejection movement. However, when the stop is engaged and movement of outer plunger 3 is interrupted, then continued supply of power to the single piston and cylinder 33 will cause main ejector 19 and its punch 4 to continue their upward movement and thus complete the ejection of the body portion 20 of the article, as shown in Fig. 4. Such upward movement of the operating ejector means 19 is against the constant pressure cushion 28, it being understood that all of the constant pressure sources disclosed herein may be of the hydro-pneumatic type or of any other suitable type permitting a cushioning action. During the ejection operation the top punch 5 is lifted, as shown in Figs. 3 and 4, and after the ejection is completed the operating fluid in cylinder 33 is released thus permitting the various operating elements to resume, as shown in Fig. 1, their initial position, the downward movement of outer plunger 3 being dependent upon downward movement of inner plunger 4. Thus it is seen that the upward ejection movement of element 3 as well as its downward repositioning movement preparatory to refilling the die cavity are entirely dependent upon movement of plunger 4 thereby permitting the use of a single power operating means which, because of its single continuous movement, may be of the hydraulic type 33 or of the mechanical type such as a usual rotating crank or cam not shown as these do not constitute a part of my present invention and in any event are well known mechanisms for this purpose. The top punch 5 of course remains lifted until the die cavity is refilled. A vented recess 39 is provided to receive the core rod 6 when the article is being compacted.

The die platen 1 may be made stationary thereby eliminating the use of cushion 8. To do this it is only necessary to adjust stop 29 to the dotted line position 40, Fig. 1. In this case the compression movement of punch 5 within the die 2 will be accompanied by a simultaneous upward movement of motor 33 so as to move plunger 4 inwardly of the die cavity until the top punch and plunger 4 are in the positions shown in Fig. 2 relative to the die cavity. Of course, the die platen will be held against the upper stop 7 at this time by reason of the aforesaid adjustment of stop 29 to its position 40. The remaining operations will be the same as shown in Figs. 3 and 4.

From the foregoing disclosure it is seen that I have provided very effective means for forming flanged articles made from powdered material and that only one means is required for raising and leveling both the inner and outer plungers during the ejection operation thereby eliminating the complications incident to having separate motors for independently moving the lower concentric plungers as heretofore used. Hence, I am able to obtain a high degree of precision ejection in a relatively simple manner and without sacrificing the flexibility of operation of the pressing apparatus in adapting it to the formation of articles of different dimensions.

It will of course be understood that various changes in details of construction and arrangement of parts may be made by those skilled in the art without departing from the spirit of the invention as set forth in the appended claims.

I claim:

1. Pressing apparatus for forming loose material into an article having an axially extending body portion and a flange comprising, in combination, a floating die platen having a die cavity that floats downwardly when material is compressed therein, a pair of relatively axially movable concentric plungers disposed in one end of the die cavity and whose end surfaces within the cavity are axially offset from each other to form respectively surfaces of the flange and of the body on one side of the article, a punch receivable in the other end of the die cavity, means for relatively moving the plungers and punch toward each other to form the article while the platen floats downwardly, means for mechanically maintaining the flange forming plunger in a fixed relation to the floating die platen throughout its downward movement and during complete formation of the flange, means for mechanically preventing downward movement of the die platen after the article is formed, ejection power actuating means, means operated by said ejection power means for moving the concentric plungers simultaneously to eject the formed article including means for maintaining a fixed relation between the concentric plungers thereby to cause the concentric plungers to support the flange and body during the initial portion of the ejection movement, and means for interrupting movement of one of said concentric plungers while continued operation of said power means causes the other concentric plunger to complete the ejection of the article.

2. Pressing apparatus for forming loose material into an article having an axially extending body portion and a flange comprising, in combination, a floating die platen having a die cavity that floats downwardly when material is compressed therein, a pair of relatively axially movable concentric plungers disposed in one end of the die cavity and whose end surfaces within the cavity are axially offset from each other to form respectively surfaces of the flange and of the body on one side of the article, a punch receivable in the other end of the die cavity, actuating means for relatively moving the concentric plungers and punch toward each other to form the article while the die platen floats downwardly, means for maintaining the flange forming plunger in a fixed relation to the floating die platen throughout its downward movement and during complete formation of the flange, actuating means for moving one of the concentric plungers in an ejection direction, means for simultaneously mechanically moving immediately therewith the other concentric plunger by said actuating means, thereby to cause the concentric plungers to support the flange and body of the article during ejection movement thereof, means for interrupting ejection movement of one of said plungers substantially after the flange of the article is clear of the die cavity, and means whereby after said interruption the movement of the other of said concentric plungers may be continued by said actuating means so that relative axial movement occurs between the body and flange plungers to eject the article.

3. The combination set forth in claim 2 further characterized in that the means for continuing movement of one of the concentric plungers after interruption of the ejection movement of the other concentric plunger includes yieldable means interposed between the actuating means and the interruptable concentric plunger so as to transmit movement from the actuating means to the interruptable plunger and when said interruption occurs said yieldable means will allow the actuating means to continue its ejection movement.

4. The combination set forth in claim 2 further characterized in that the interruptable plunger has yieldable means for biasing the same downwardly in the direction of compressing movement of the punch whereby during ejection movement of said interruptable plunger the yieldable means thereof allows such plunger to have its ejection movement.

5. The combination set forth in claim 2 further characterized in that the interruptable plunger has yieldable means for biasing the same downwardly in the direction of compressing movement of the punch whereby during ejection movement of said interruptable plunger the yieldable means thereof allows such plunger to have its ejection movement, said yieldable means comprising a piston and cylinder and a source of constant pressure cushion fluid supplied to said cylinder to bias the piston thereof in said compressing direction.

6. The combination set forth in claim 2 further characterized in that the means for continuing movement of one of the concentric plungers after interruption of the ejection movement of the other concentric plunger includes yieldable means interposed between the actuating means and interruptable concentric plunger so as to transmit movement from the actuating means to the interruptable plunger and when said interruption occurs said yieldable means will allow the actuating means to continue its ejection movement, and means for variably establishing a fixed relation between said interruptable plunger relative to the die cavity in a position to limit the depth of the die cavity insofar as it is defined by the end of this particular plunger.

7. The combination set forth in claim 2 further characterized in that the means for continuing movement of one of the concentric plungers after interruption of the ejection movement of the other concentric plunger includes yieldable means interposed between the actuating means and interruptable concentric plunger so as to transmit movement from the actuating means to the interruptable plunger and when said interruption occurs said yieldable means will allow the actuating means to continue its ejection movement, means for variably establishing a fixed relation between said interruptable plunger relative to the die cavity in a position to limit the depth of the die cavity insofar as it is defined by the end of this particular plunger, and means for adjusting said fixed position of said plunger to vary one of the axial dimensions of the article.

8. The combination set forth in claim 2 further characterized by the provision of variable means for establishing mechanically fixed positions of both of said concentric plungers to define the maximum depths of the die cavity insofar as it is defined by the ends of the particular plungers.

9. Pressing apparatus for forming loose material into an article having an axially extending body portion and a flange comprising, in combination, a floating platen having a die cavity that floats downwardly when material is compressed therein, a pair of relatively axially movable concentric plungers disposed in one end of the die cavity and whose end surfaces within the cavity are axially offset from each other to form surfaces of the flange and of the body on one side of the article, a punch receivable in the other end of the die cavity, means for supporting one of said concentric plungers in a fixed compression position so that upon downward movement of the floating die platen relative movement occurs between such plunger and the die to compress the body portion of the article, means for establishing a fixed compression position of the other plunger relative to the die platen throughout its downward movement to form the article flange, means for effecting relative movement between the concentric plungers and the punch to compress an article during which time the floating platen moves in the direction of compression so that the material is compressed from opposite ends of the article toward the fixed end of the plunger against which the flange is formed, means for effecting simultaneous ejection movement of the concentric plungers upon completion of the compression operation, and means for relatively moving said concentric plungers to continue ejection of the formed article.

References Cited in the file of this patent

UNITED STATES PATENTS

| 1,679,408 | Davis et al. | Aug. 7, 1928 |
| 2,499,980 | Stokes et al. | Mar. 7, 1950 |
| 2,509,783 | Richardson | May 30, 1950 |

FOREIGN PATENTS

| 927,283 | France | Oct. 24, 1947 |